US010719718B2

(12) United States Patent
Westhofen et al.

(10) Patent No.: US 10,719,718 B2
(45) Date of Patent: Jul. 21, 2020

(54) DEVICE FOR ENABLING A VEHICLE TO AUTOMATICALLY RESUME MOVING

(71) Applicant: Conti Temic microelectronic GmbH, Nuremberg (DE)

(72) Inventors: Daniel Westhofen, Dammbach (DE); Christian Scharfenberger, Amtzell (DE); Heiko Hahn, St. Gallen (CH)

(73) Assignee: Conti Temic microelectronic GmbH, Nuremberg (DE)

( * ) Notice: Subject to any disclaimer, the term of this patent is extended or adjusted under 35 U.S.C. 154(b) by 232 days.

(21) Appl. No.: 15/950,646

(22) Filed: Apr. 11, 2018

(65) Prior Publication Data

US 2018/0300558 A1 Oct. 18, 2018

(30) Foreign Application Priority Data

Apr. 18, 2017 (EP) ..................................... 17166745

(51) Int. Cl.
*G06K 9/00* (2006.01)
*G06K 9/46* (2006.01)
(Continued)

(52) U.S. Cl.
CPC ......... *G06K 9/00791* (2013.01); *B60W 10/04* (2013.01); *B60W 10/18* (2013.01); *B60W 30/16* (2013.01); *G05D 1/0214* (2013.01); *G05D 1/0246* (2013.01); *G06K 9/46* (2013.01); *G06T 7/248* (2017.01); *G06T 7/74* (2017.01); *B60W 2420/42* (2013.01); *B60W 2420/52* (2013.01);
(Continued)

(58) Field of Classification Search
CPC .. G06K 9/00791; G06K 9/00805; G06K 9/46; G06K 9/4604; G06K 9/4652; G06K 2009/4666; G06T 7/246; G06T 7/248; G06T 7/73; G06T 7/74; G06T 2207/30252; G06T 2207/30261; G05D 1/0246; B60W 30/16; B60W 30/17; B60W 2550/10; B60W 2550/308; B60W 2554/00; B60W 2554/801
See application file for complete search history.

(56) References Cited

U.S. PATENT DOCUMENTS

| 6,590,521 B1 | 7/2003 | Saka et al. ...................... 342/70 |
| 2012/0166058 A1 | 6/2012 | Armbrust ......................... 701/96 |
| 2017/0371338 A1* | 12/2017 | Kamata et al. ......... G01S 17/93 |

FOREIGN PATENT DOCUMENTS

| EP | 1703482 A1 | 9/2006 | ............... G08G 1/16 |
| EP | 2028632 A2 | 2/2009 | ............... G08G 1/16 |
| WO | 03/001472 A1 | 1/2003 | ............... G08G 1/16 |

OTHER PUBLICATIONS

Machine translation of EP 2 028 632 A2, Feb. 25, 2009.*
(Continued)

*Primary Examiner* — Andrew W Johns

(57) ABSTRACT

A processing unit with at least one image that relates to a scene external to a vehicle, processes the image to extract low level features. A low level feature is defined such that an object in the scene cannot be characterized on the basis of at least one low level feature in a single image of the at least one scene. The processing unit determines if at least a part of an object is present in a part of the scene, the determination comprises an analysis of the low level features. An output unit outputs information that there is something present in the scene.

13 Claims, 3 Drawing Sheets

(51) Int. Cl.
- *G06T 7/246* (2017.01)
- *B60W 30/16* (2020.01)
- *B60W 10/18* (2012.01)
- *B60W 10/04* (2006.01)
- *G06T 7/73* (2017.01)
- *G05D 1/02* (2020.01)

(52) U.S. Cl.
CPC ... *B60W 2554/00* (2020.02); *B60W 2554/801* (2020.02); *B60W 2710/09* (2013.01); *B60W 2710/18* (2013.01); *B60W 2720/10* (2013.01); *G05D 2201/0213* (2013.01); *G06T 2207/30252* (2013.01)

(56) References Cited

OTHER PUBLICATIONS

Search Report dated Oct. 11, 2017 from corresponding European Patent Application No. 17 16 6745.4.
European Patent Office Exam Report dated Jul. 23, 2019 for corresponding European Patent Application No. 17 166 745.4.

\* cited by examiner

DEVICE FOR ENABLING A VEHICLE TO AUTOMATICALLY RESUME MOVING

FIELD OF THE INVENTION

The present invention relates to a device for enabling a vehicle to automatically resume moving, to a system for enabling a vehicle to automatically resume moving, to a method for enabling a vehicle to automatically resume moving, as well as to a computer program element.

BACKGROUND OF THE INVENTION

The general background of this invention is the field of driving warning and information provision systems, and adaptive cruise control (ACC).

ACC is an important function in today's automotive industry. ACC actively controls the driver's vehicle (usually referred to as "ego vehicle") to maintain a certain distance between the driver's vehicle and other road users in front of the vehicle, such as a vehicle located in front of and in the same lane as the ego vehicle (usually referred to as the "target vehicle"). In general, each ACC system includes at least one sensor that extracts specific information about the target vehicle, such as its distance to the ego vehicle, its velocity, its acceleration, its deceleration et cetera. This information is further processed to send acceleration/deceleration requests to a unit controlling the engine of the ego vehicle, hence controlling the velocity of the ego vehicle and its distance to the target vehicle. A sensing unit of an ACC system can be a single camera, a radar system or a combination of both. With current ACC systems, the ego vehicle can be controlled until standstill behind a decelerating target vehicle. When the target vehicle resumes after standstill, some ACC systems automatically allow the ego vehicle to resume after a short period of standstill. The process of decelerating until standstill resuming thereafter is called "ACC Stop and Go", and automatically resuming after standstill is called "ACC Auto-Go". Before resuming, a confirmation about the clear space between the ego vehicle and target vehicle is required to avoid collisions in scenarios such as traffic jams where, during standstill, vulnerable road users might have entered the area between the ego vehicle and the target vehicle. The clearance confirmation can be for example a simple yes/no single bit or an object list indicating the presence of objects in the relevant area.

However, current ACC systems as part of overall advanced driving assist systems (ADAS) do not have a sufficiently low false negative rate (relevant objects should not be missed) whilst keeping the number of wrong detections low (low false positive rate).

There is a need to address this situation.

SUMMARY OF THE INVENTION

It would be advantageous to have an improved device for enabling a vehicle to automatically resume moving.

The object of the present invention is solved with the subject matter of the independent claims, wherein further embodiments are incorporated in the dependent claims. It should be noted that the following described aspects and examples of the invention apply also for the device for enabling a vehicle to automatically resume moving, the system for enabling a vehicle to automatically resume moving, the method for enabling a vehicle to automatically resume moving, and for the computer program element.

In a first aspect, there is provided a device for enabling a vehicle to automatically resume moving, comprising:
an input unit;
a processing unit; and
an output unit.

The input unit is configured to provide the processing unit with at least one image, the at least one image relating to a scene external to a vehicle. The processing unit is configured to process the at least one image to extract low level features. A low level feature is defined such that an object in the scene cannot be characterised on the basis of at least one low level feature in a single image of the at least one image. The processing unit is also configured to determine if at least a part of an object is present in a part of the scene, the determination comprising an analysis of the low level features. The output unit is configured to output information that there is something present in the scene.

In other words, features extracted in imagery that are not useable in normal advanced driving assist system (ADAS) for example for Advanced Braking Systems (ABS) can be used to determine if there is potentially an object in front of a vehicle, and this enables an adaptive cruise control (ACC) system to not automatically resume moving the car forward after having come to a standstill. For example, objects such as small children or pedestrians that are only partially within the field of view of a sensor system and/or partially obscured for example by the bonnet of a car can be detected and the car can be inhibited from automatically moving forward. And this prohibition of automatically resuming from a standstill can be based on information that is not normally useable by the ADAS system. To put this another way, features that are not determined with a high enough confidence to be classified as particular objects can still be determined to be an object that is potentially violating a clearance space in front of a vehicle, thereby stopping the vehicle from automatically resuming from a standstill.

Thus information relating to objects that cannot normally be detected, including those partially occluded and/or very near to the vehicle, is used to indicate that a vulnerable road user is potentially in or in the process of entering the clearance space in front of a vehicle (or indeed behind the vehicle if the vehicle is reversing) and appropriate action can be taken to stop the vehicle from automatically moving forward as part of a ACC system.

In this manner, a whole host of different features within a captured scene, which each have an associated low confidence level with respect to the operation of a functionalities of a normal ADAS system can be analysed together enabling the ACC system to stop the vehicle automatically moving forward on the basis of information that individually does not constitute that necessary for a binary decision.

In this way, the chance of there being a false negative (for example there being a child right in front of the car and partially obscured by the bonnet of the car) and the car automatically moving forward from a standstill is dramatically reduced with respect to current system, because information that is not useable within current system, and is in effect thrown away because individual parts of that information has too low a confidence level for it to relate to an object that can be characterised, is now used in order to determine if an object could potentially be in front of the vehicle and the ego vehicle prohibited from automatically progressing.

According to an example, the processing unit is configured to implement an algorithm based on artificial intelligence to analyse the low level features.

In this way, one or more low level features, that have low confidence levels and constitute weak classifier responses, can be utilized within a machine learning or neural network environment to enable a determination to be made that there is potentially an object in the clearance space and that the vehicle should be stopped from automatically progressing.

According to an example, the processing unit is configured to process the at least one image to extract high level features. A high level feature is defined such that an object in the scene can be characterised on the basis of at least one high level feature in a single image of the at least one image. The determination if at least a part of an object is present in the scene also comprises an analysis of the high level features.

In this way, features that are normally processed and characterised within an ADAS system, such as that there is a target vehicle in front of the ego vehicle with an associated position of that target vehicle, with other information being determined such as the position of the sides of the road and the position of pavements, can be used to better enable the low level features to be analysed to determine if there is a potential object that needs to be considered.

It is to be noted in this respect, that in a normal ADAS system, "high level" features can have associated high and low confidence levels associated with them, and here we refer to a high level feature as a feature that has a relatively high confidence level, in that an object in the scene can be characterised on the basis of at least one high level feature in a single image. Therefore, in a existing ADAS system a high level feature with a low confidence level, which is not used as such, here falls within the definition of our low level feature.

According to an example, the high level features comprises a target vehicle. The part of the scene within which the processing unit is configured to determine that at least a part of an object is present is determined as the region between the vehicle and the target vehicle.

Thus, the region within which a pedestrian count enter when the ego vehicle is stationary can be defined, such that the existence of potential objects within this region can be searched for to enable the in-vehicle systems to not allow the ego vehicle to automatically move forward if such a potential object is determined to be in that region. Also, if the target vehicle is too close, for example has reversed backwards slightly after the ego vehicle has come to a stop, again the ego vehicle can be stopped from moving forwards automatically.

According to an example, the analysis of the low level features comprises determining at least one potential object in the part of the scene and determining at least one confidence level, such that a potential object has an associated confidence level. A potential object is then determined to be the at least part of the object when the confidence level for that potential object is above a threshold value.

According to an example, the at least one image comprises a first image and a second image, and wherein confidence levels determined from the first image are updated on the basis of confidence levels determined from the second image.

In other words, information relating to an intrusion object can be obtained over more than one cycle of a sensor system, for example for more than one acquisition frame cycle of a camera, and a confidence level (or risk value) cumulated according to the type of detected feature and its reliability, and if this confidence value exceeds a threshold clearance to move forward will be revoked.

Thus, if low level features in one image suggest that a potential object is located at a position in that image, and in a second image the analysis of low level features again suggests that a potential object exists that from its position could be the same potential object as that observed in the first image, then a confidence level that there is indeed an object there can be increased.

According to an example, the processing unit is configured to track potential objects across the first image and second image.

Therefore, not only can a potential object be determined with ever greater confidence within images because the trace or track of that object is consistent with it being for example a pedestrian thereby ensuring that there are no false positives, but false positives can be mitigated through such tracking when either a track of features is not consistent with it being a true object and/or a potential object disappears. In other words, a de-bouncing mechanism is provided where a potential intrusion object can be observed for more than one image (e.g. for more than one cycle of a camera system) and/or a risk value can be cumulated according to the type of detected feature and its reliability.

According to an example, at least one of the at least one image was acquired by at least one camera.

Thus, a vehicle camera that for example already forms part of an ADAS system can be used as part of an ACC stop and go system.

According to an example, at least one of the at least one image was acquired by a radar sensor.

Thus, a radar system that for example already forms part of an ADAS system can be used as part of an ACC stop and go system, which can also be used in combination with data acquired from a camera system.

According to an example, the at least part of the object is within a distance of 2.5 m from an outer periphery of the vehicle.

Thus, objects in the region of space that is very close to the ego vehicle, and could be partially occluded by parts of the ego vehicle can be detected.

According to an example, the at least one image was captured whilst the vehicle was stationary.

According to an example, the low level features comprises one or more of: colour information; edges; gradients; optic flow; optic flow clusters, saliency information.

In a second aspect, there is provided a system for enabling a vehicle to automatically resume moving, comprising:
at least one sensor system;
a device for enabling a vehicle to automatically resume moving according to the first aspect.

The device is configured to be located within a vehicle. The at least one sensor system is configured to be located within the vehicle and the at least sensor system is configured to acquire the at least one image relating to a scene external to the vehicle viewed.

In this manner, for example a camera based system is provided for a vehicle such as a car, that can make use of existing cameras or use bespoke cameras that are looking at scenes outside of the vehicle with the cameras focussed on infinity, and the system enables the vehicle to automatically proceed from a standstill when no objects are detected in the clearance area and stops the vehicle from automatically moving forward when at least part of an object has been determined to be in the clearance area. Similarly, an existing radar system can be used instead of, or in combination with, such a camera system.

In a third aspect, there is provided a method for enabling a vehicle to automatically resume moving, comprising:

a) providing a processing unit with at least one image, the at least one image relating to a scene external to a vehicle;
b) processing with the processing unit the at least one image to extract low level features; wherein a low level feature is defined such that an object in the scene cannot be characterised on the basis of at least one low level feature in a single image of the at least one scene;
c) determining with the processing unit if at least a part of an object is present in a part of the scene, the determination comprising an analysis of the low level features; and
d) outputting with an output unit output information that there is something present in the scene.

According to another aspect, there is provided a computer program element controlling apparatus as previously described which, in the computer program element is executed by processing unit, is adapted to perform the method steps as previously described.

There is also provided a computer readable medium having stored the computer element as previously described.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
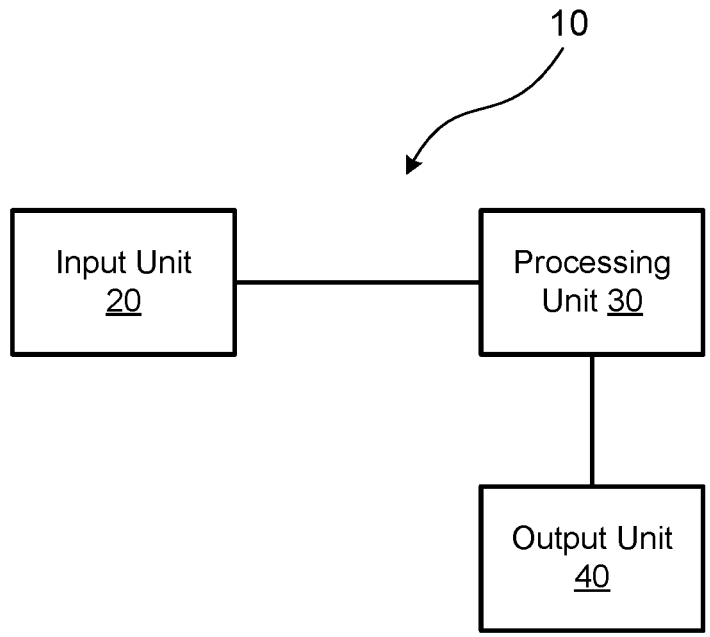
FIG. 1 shows a schematic set up of an example of a device for enabling a vehicle to automatically resume moving.

FIG. 1 shows an example of a device 10 for enabling a vehicle to automatically resume moving. The device 10 comprises an input unit 20, a processing unit 30, and an output unit 40. The input unit 20 is configured to provide the processing unit 30 with at least one image, via wired or wireless communication. The at least one image relates to a scene external to a vehicle. The processing unit 30 is configured to process the at least one image to extract low level features. A low level feature is defined such that an object in the scene cannot be characterised on the basis of at least one low level feature in a single image of the at least one image. The processing unit 30 is also configured to determine if at least a part of an object is present in a part of the scene. The determination comprises an analysis of the low level features. The output unit 40 is configured to output information that there is something present in the scene.

In an example, the processing unit is configured to implement a decision tree analysis algorithm to analyse the low level features.

According to an example, the processing unit is configured to implement an algorithm based on artificial intelligence to analyse the low level features.

In an example, the algorithm based on artificial intelligence is a machine learning algorithm. In an example, the algorithm based on artificial intelligence is a neural network. In an example, the algorithm based on artificial intelligence is a heat map algorithm.

According to an example, the processing unit is configured to process the at least one image to extract high level features. A high level feature is defined such that an object in the scene can be characterised on the basis of at least one high level feature in a single image of the at least one image. The determination if at least a part of an object is present in the scene then also comprises an analysis of the high level features.

In an example, high level features can be extracted from objects such as pedestrians.

According to an example, the high level features comprises a target vehicle. The part of the scene within which the processing unit is configured to determine that at least a part of an object is present is determined as the region between the vehicle and the target vehicle.

In an example, high-level features can be extracted from objects such as pedestrians entering the area between target and ego vehicle as well if they are visible entirely.

In an example, the target vehicle is a car, or lorry, or motorcycle. In an example, the ego vehicle is a car, or lorry, or motorcycle.

According to an example, the analysis of the low level features comprises determining at least one potential object in the part of the scene and determining at least one confidence level, such that a potential object has an associated confidence level. A potential object is then determined to be the at least part of the object when the confidence level for that potential object is above a threshold value.

In an example, the threshold is manually optimized and/or machine learned. Thus, thresholds could be set that are object specific, such that if there is a chance that the analysis of the low level features tend to indicate the possibility that a child could be in the clearance space the threshold could be set lower than if there is a potential for an adult in the clearance space. The threshold can also take account of where the potential object is within the clearance space as well as taking into account the potential type of object. For example, if the object could potentially be a child the threshold could be set low irrespective of where that object is within the clearance space, thereby ensuring that any movement forward of the vehicle would not panic the child. However, if the object could potentially be an adult, the threshold level could be varied depending upon where within that space the object is located.

According to an example, the at least one image comprises a first image and a second image, and wherein confidence levels determined from the first image are updated on the basis of confidence levels determined from the second image.

In an example, the at least one image comprises n images, and wherein confidence levels determined from the first image are updated on the basis of confidence levels determined from an nth image.

According to an example, the processing unit is configured to track potential objects across the first image and second image.

According to an example, at least one of the at least one image was acquired by at least one camera.

According to an example, at least one of the at least one image was acquired by a radar sensor.

According to an example, the at least part of the object is within a distance of 2.5 m from an outer periphery of the vehicle.

According to an example, the at least one image was captured whilst the vehicle was stationary.

According to an example, the low level features comprises one or more of: colour information; edges; gradients; optic flow; optic flow clusters, saliency information.

In an example, low level features can be individual ones of colour information; edges; gradients; optic flow; optic flow clusters. In an example, mid-level features can be formed from a combination of more than one of: colour information; edges; gradients; optic flow; optic flow clusters. The mid-level features are however still not high level features, in that an object in the scene cannot be characterised on the basis of such a mid level feature in a single image of the at least one image.

Figure 2:
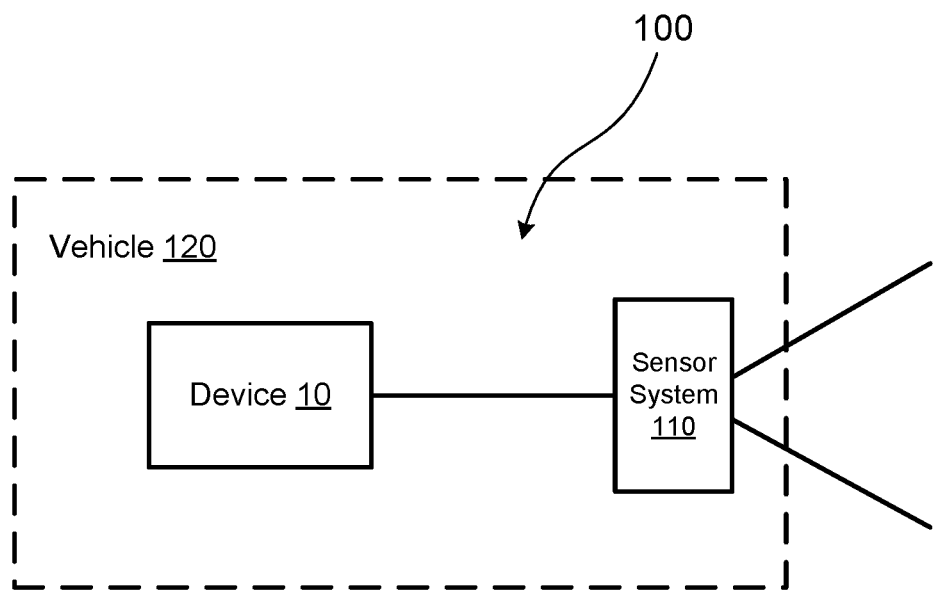
FIG. 2 shows a schematic set up of an example of a system for enabling a vehicle to automatically resume moving.

FIG. 2 shows an example of a system 100 for enabling a vehicle to automatically resume moving. The system 100 comprises at least one sensor system 110, and a device 10 for enabling a vehicle to automatically resume moving as described with respect to FIG. 1. The device 10 is configured to be located within a vehicle 120. The at least one sensor system 110 is configured to be located within the vehicle 120 and the at least sensor system 110 is configured to acquire the at least one image relating to a scene external to the vehicle viewed.

In an example, the at least one sensor system 110 is the input unit 20.

Figure 3:
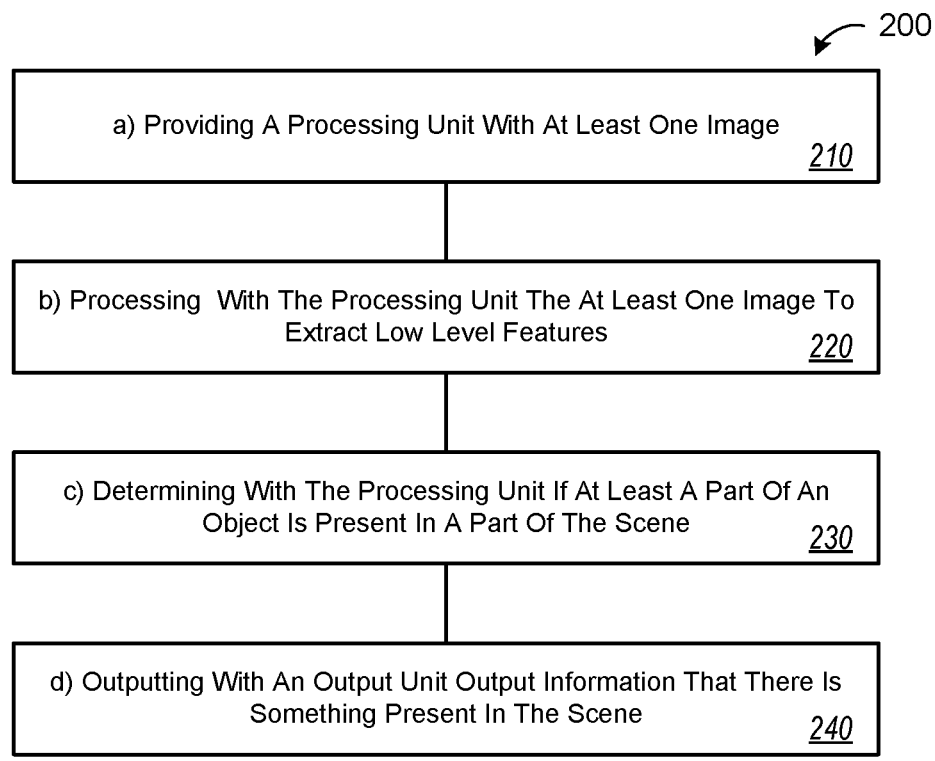
FIG. 3 shows a method for enabling a vehicle to automatically resume moving.

FIG. 3 shows a method 200 for enabling a vehicle to automatically resume moving in its basic steps. The method 200 comprises:

in a providing step 210, also referred to as step a), providing a processing unit 30 with at least one image, the at least one image relating to a scene external to a vehicle;

in a processing step 220, also referred to as step b), processing with the processing unit the at least one image to extract low level features; wherein a low level feature is defined such that an object in the scene cannot be characterised on the basis of at least one low level feature in a single image of the at least one scene;

in a determining step 230, also referred to as step c), determining with the processing unit if at least a part of an object is present in a part of the scene, the determination comprising an analysis of the low level features; and in an outputting step 240, also referred to as step d), outputting with an output unit 40 output information that there is something present in the scene.

In an example, step c) comprises implementing an algorithm based on artificial intelligence to analyse the low level features.

In an example, step b) comprises processing the at least one image to extract high level features, wherein a high level feature is defined such that an object in the scene can be characterised on the basis of at least one high level feature in a single image of the at least one image; and step c) comprises an analysis of the high level features.

In an example, the high level features comprises a target vehicle, and wherein the part of the scene within which the processing unit is configured to determine that at least a part of an object is present is determined as the region between the vehicle and the target vehicle.

In an example, the analysis of the low level features in step c) comprises determining at least one potential object in the part of the scene and determining at least one confidence level, such that a potential object has an associated confidence level, and wherein a potential object is determined to be the at least part of the object when the confidence level for that potential object is above a threshold value.

In an example, the at least one image comprises a first image and a second image, and wherein confidence levels determined from the first image are updated on the basis of confidence levels determined from the second image.

In an example, the processing unit is configured to track potential objects across the first image and second image.

Figure 4:
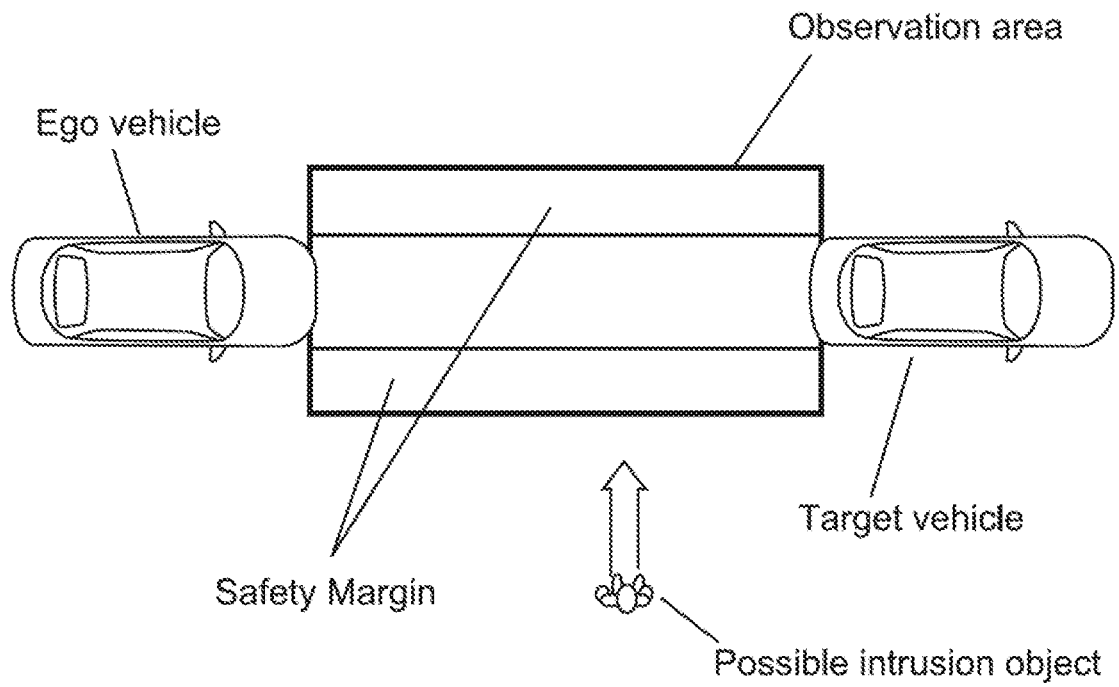
FIG. 4 shows an example of an Ego vehicle behind a target vehicle, the observation area and possibly intruding object.
Figure 5:
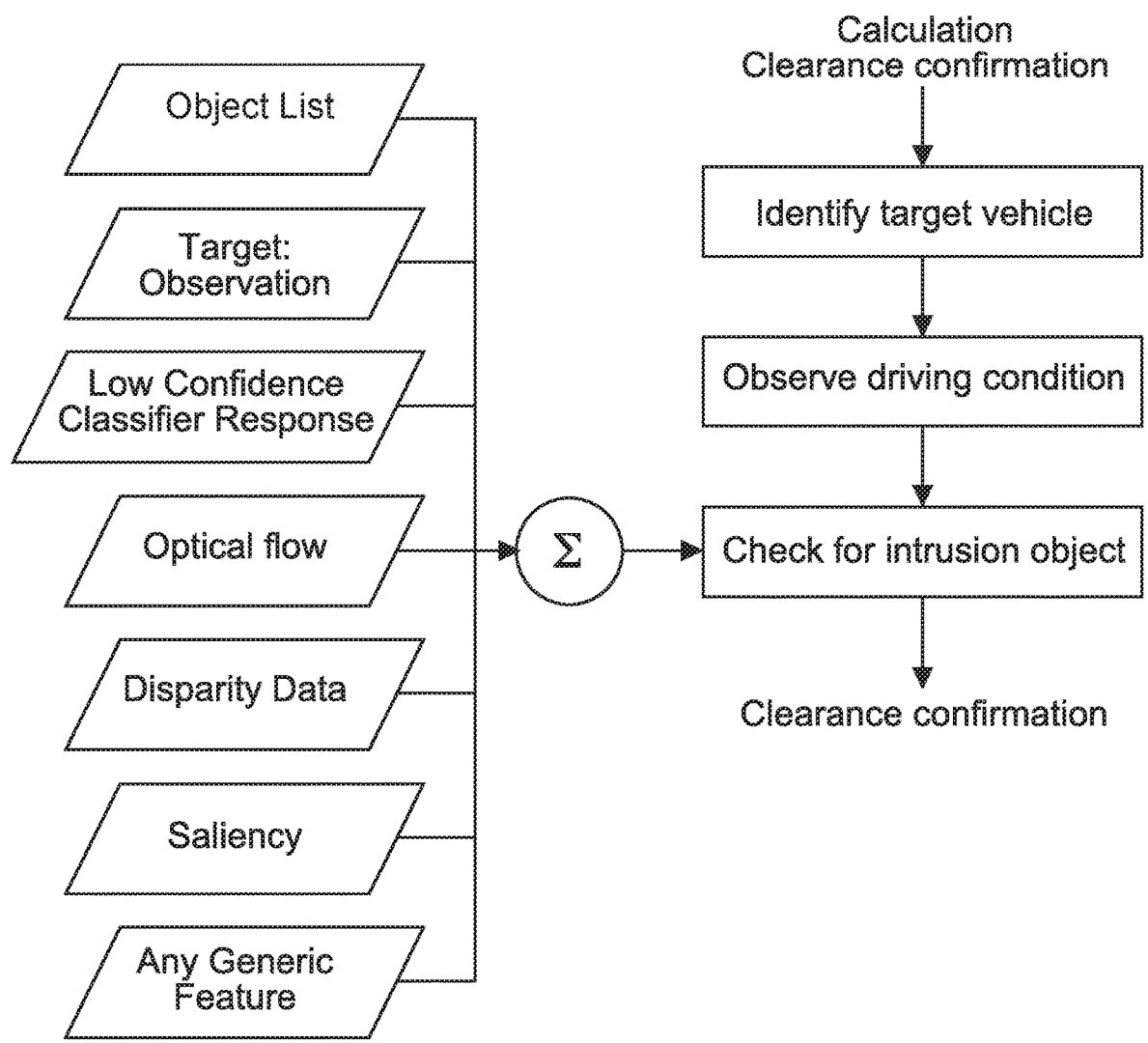
FIG. 5 shows a flow chart of an example of an algorithm used for enabling a vehicle to automatically resume moving.

The device, system and method are now described in further detail with respect to FIGS. 4-5.

FIG. 4 shows an example, of an arbitrary object (pedestrian) entering a monitored area between an ego vehicle and the target vehicle. A camera based approach is used to detect objects, which can be very close to the ego vehicle, and which are either located in the observation area (or clearance space) between the ego vehicle and the target vehicle or about to enter the observation area. A radar-based approach could also be utilised, and a camera and radar based approach could be utilised.

The present approach to determining if an object is present in the observation area with a low false negative rate can be best understood by first considering an ADAS such as enhanced brake assist (EBA), which classifies an object with a high degree of confidence (here called high-level object features) in order for action to be taken. Information within the scene, which can be considered to be low-level object features and medium level object features which cannot be used to classify an object, and therefore are not considered by an EBA system, are now processed within the present approach to determine if an object is within or about to enter the observation area. Therefore, considering an EBA system the object detection/characterization process can be described as follows:

1) Define n patches of a certain size and slide them over the entire image

2) For each position of a patch, extract low-level features such as colors, edges, gradients, etc.

3) Arrange all features in a smart manner to form a feature descriptor (mid-level features). Here mid level features are a combination of low-level features (motifs), hypotheses, optic flow, flow clusters.

4) Use this descriptor to compute the probability of the patch to contain an object of interest. The patch will become a hypothesis if this probability is larger than a certain threshold (mid-level features)

5) Since the patches are slid all over the image, many hypotheses are produced for the same object. →Perform non-maximum suppression on the hypotheses to just keep the one with the highest probability value, ideally representing the object to detect.

6) Use the descriptor of the remaining hypothesis to classify the object as either vehicle, pedestrian, etc., and compute the confidence of this object to belong to the class identified.

However, now in the current approach steps 1-4 are carried out, and new step 5 takes all the low level features and mid level features and processes these to determine if there could be an object present. In other words, intermediate processing steps and the information available at those steps which is not used in a complete ADAS solution, is now directly utilised to indicate the presence of an object in the clearance space. Objects that are very close to the ego vehicle (e.g. less than 2.5 m), cannot be seen in their entirety, are either covered/hidden by the ego vehicle, have parts that are outside of the camera's field of view, are a very small object such as children whose bodies may be covered or obscured by the ego vehicle, can now be detected. This enables an ACC system to inhibit ACC Auto Go when such an object have been detected, and conversely also enables full ACC Stop and Go functionality when no such object has been detected. In this manner clearance confirmation can be reliably generated with a low false negative rate.

FIG. 5 shows a simplified flowchart of the algorithm that enables autonomous resume in an ACC system without further confirmation from the driver. A camera system, which requires imagery which is processed in the current approach, operates at a frame rate of 16 frames per second with the cycle time period between 2 consecutive frames of 66 ms. Different cameras can operate a different cycle times. A processor within the camera system, or a separate processor processing imagery from the camera system, performs close object detection at each cycle and calculates the clearance confirmation by explicitly using mid and low level features of the intermediate processing steps as discussed above. The clearance confirmation then enables an indication that the observation area was not violated by a crossing object when object that was already present in that area.

With continued reference to FIG. 5, the clearance confirmation is computed in the following basic steps:
1. identification of the target vehicle
   a. identification of the target vehicle to determine the observation area to monitor for entering or present objects
   b. the actual target vehicle is also observed while driving and in standstill in order to identify a change of the target vehicle, when for example other vehicles cutting between the ego vehicle and the actual target vehicle
   c. as part of a and b, a trace of the currently tracked target vehicle is monitored, where the trace is the track (route) of a detected vehicle formed by the locations of the vehicle in space and time. An interrupted or completely aborted trace of the target vehicle either during driving or standstill is used as an indicator of a change of the target vehicle
2. analysis of the movement of the ego vehicle and target vehicle to identify a deceleration to standstill and a potential automatic resume afterwards.
3. Monitoring of the observation area after standstill
   a. as discussed above "high-level" objects are detected and classified, which can be used for example in an EBA system. However, as discussed above low-level and medium level information is used to determine if there is potential object and the clearance space. The high-level information or objects can also be used in this process.
   b. The final result of potential object detection is an object list that is used as an indicator for violations of the observation area (clearance space)
   c. the object list contains objects detected with high confidence, which as discussed above can be used to determine information relating to the target area and information relating to the target vehicle. This high confidence information can also be used to determine if there is an object in the clearance space
   d. however, the object list now contains additional objects which can be called "hypotheses", which have not reached high confidence and therefore are not relevant for other system functions such as EBA. These hypotheses have either been newly initialised (detected) or have been updated with low confidence classify responses (a previously detected low or medium confidence object can have its confidence level updated on the basis of the presently acquired frame).
   e. With respect to EBA, a confidence level for the hypotheses is updated in every cycle according to associated classify responses (or the lack thereof), and an object hypothesis will either be advanced to a high confidence object or will be deleted if it is no longer reinforced by classify responses.
   f. However, low and mid-level features such as low confidence classify responses or flow clusters are now explicitly used in order to determine if they could be an object in the clearance space. Therefore, a low confidence classify response which will not in itself result in the initialisation of an object contained in the object list can on the basis of a continuous presence of such low confidence classify responses in a certain area indicate that there is an object in the clearance space at the position. Therefore, low confidence classify responses are accumulated in standstill for a certain period of time. If certain areas contain conspicuous clusters of such responses that can be considered as a low-level feature for the clearance confirmation. In other words, low and medium level information that does not have enough associated confidence to detect and classify an object, for use in for example an EBA, can be used to help inform the ACC that they could be something in the clearance space. Therefore, if an object is very small and/or is covered partially by the ego vehicle and cannot be classified as whole, then there may be still enough hypotheses indicating a potential violation of the clearance space.
   g. Low-level features includes features such as colour extracted from regions, edges, gradients et cetera and mid-level features includes the combination of low-level features, hypotheses, flow, flow clusters et cetera. Therefore, optical flow and flow clusters are just another form of feature that can be used instead or additionally to determine if they could be an object in the clearance space. The sudden presence of optical flow and flow clusters can indicate (directional) motion and that an object is entering the critical space. Thus, flow clusters can be considered to be the mono camera equivalent of clustered disparity data. If some close by flow vectors have a similar direction and magnitude and cover sufficient area of the image to match intruding objects, those can be clustered to create a generic object hypothesis. Tracked generic objects can then be used as a low-level feature for the clearance confirmation.
   h. Saliency information can be used as a feature to identify changes in the monitored area, indicating a potential intrusion object
   i. in addition, if stereo information is available, generic object detection based on clustered disparity data can be used in addition to that discussed above.
4. Computation of clearance confirmation
   a. low confidence outputs coming from acquired imagery is then used within a neural network machine learning algorithm to determine if there is an object or potential object in the clearance space. The neural network is trained using ground truth information, in other words using imagery that has already been analysed by human. The neural network then operates in real time on acquired imagery to determine if there is a possible object in the clearance space, in order to provide clearance confirmation within an ACC system. As discussed above the high confidence information can also be used within the neural network machine learning algorithm. Rather than use a neural network machine learning algorithm, a "handcrafted" decision tree algorithm can be utilised.

b. To improve the false positive rate a de bouncing mechanism is utilised. This means that an intrusion object is observed to several cycles and/or risk value is cumulated according to the type of detected featureless reliability. Only if a certain threshold (either manually optimised machine learned) is reached will automatic resumption of vehicle motion be revoked.

c. As discussed above, the "high level" object list can be used for direct observation of the target vehicle. Before the clearance detection and subsequently the auto-go feature is activated the current target vehicle that is being followed has to be identified. As soon as the target vehicle has been identified and a stopping maneuver is performed the detection of the target vehicle is expected to remain present. If the track of the target object is lost this can be interpreted as a sign that the target vehicle is now occluded (for example due to someone walking in front if the sensor on the ego vehicle). In this case the clearance for auto-go is also rejected.

In addition, or in replacement, to a camera sensor, radar or ultrasonic sensors can be utilized to determine if potential objects are in the clearance space in order to provide clearance confirmation in the manner described above.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

According to a further exemplary embodiment of the present invention, a computer readable medium, such as a CD-ROM, is presented wherein the computer readable medium has a computer program element stored on it which computer program element is described by the preceding section.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A device for enabling a vehicle to automatically resume moving, the device comprising:
an input unit;
a processing unit coupled to the input unit; and
an output unit coupled to the processing unit;
wherein, the input unit is configured to provide the processing unit with at least one image, the at least one image relating to a scene external to a vehicle;
wherein, the processing unit is configured to process the at least one image to extract low level features and high level features;
wherein a low level feature is an object in the scene that cannot be characterized on the basis of at least one low level feature in a single image of the at least one image;
wherein a high level feature is an object in the scene that can be characterized on the basis of at least one high level feature in a single image of the at least one image;
wherein, the processing unit is configured to determine if at least a part of an object is present in a part of the scene, the determination comprising an analysis of the low level features and of the high level features; and
wherein, the output unit is configured to output information that there is something present in the scene.

2. The device of claim 1, wherein the processing unit is configured to implement an algorithm based on artificial intelligence to analyze the low level features.

3. The device of claim 1, wherein the high level features comprise a target vehicle, and wherein the part of the scene within which the processing unit is configured to determine that at least a part of an object is present is determined as the region between the vehicle and the target vehicle.

4. The device of claim 1, wherein the analysis of the low level features comprises determining at least one potential object in the part of the scene and determining at least one confidence level, such that a potential object has an associated confidence level, and wherein a potential object is determined to be the at least part of the object when the confidence level for that potential object is above a threshold value.

5. The device of claim 4, wherein the at least one image comprises a first image and a second image, and wherein confidence levels determined from the first image are updated on the basis of confidence levels determined from the second image.

6. The device of claim 5, wherein the processing unit is configured to track potential objects across the first image and second image.

7. The device of claim 1, wherein at least one of the at least one image was acquired by at least one camera.

8. The device of claim 1, wherein at least one of the at least one image was acquired by a radar sensor.

9. The device of claim 1, wherein the at least part of the object is within a distance of 2.5 m from an outer periphery of the vehicle.

10. The device of claim 1, wherein the low level features comprises one or more of: colour information; edges; gradients; optic flow; optic flow clusters, saliency information.

11. The device according to claim 1, wherein the at least one image was captured whilst the vehicle was stationary.

12. A system for enabling a vehicle to automatically resume moving, the system comprising:
- at least one sensor system configured to be located within a vehicle and to acquire the at least one image relating to a scene external to the vehicle viewed;
- a device for enabling a vehicle to automatically resume moving, the device is configured to be located within the vehicle, the device comprising:
  - an input unit;
  - a processing unit coupled to the input unit; and
  - an output unit coupled to the processing unit;
  - wherein, the input unit is configured to provide the processing unit with the at least one image;
  - wherein, the processing unit is configured to process the at least one image to extract low level features and high level features;
  - wherein a low level feature is an object in the scene that cannot be characterized on the basis of at least one low level feature in a single image of the at least one image;
  - wherein a high level feature is defined such that an object in the scene can be characterized on the basis of at least one high level feature in a single image of the at least one image;
  - wherein, the processing unit is configured to determine if at least a part of an object is present in a part of the scene, the determination comprising an analysis of the low level features and of the high level features; and
  - wherein, the output unit is configured to output information that there is something present in the scene.

13. A method for enabling a vehicle to automatically resume moving, the method comprising:
- providing a processing unit with at least one image, the at least one image relating to a scene external to a vehicle;
- processing with the processing unit the at least one image to extract low level features, a low level feature is an object in the scene that cannot be characterized on the basis of at least one low level feature in a single image of the at least one image;
- processing with the processing unit the at least one image to extract high level features, a high level feature is an object in the scene characterized on the basis of at least one high level feature in a single image of the at least one image;
- determining with the processing unit if at least a part of an object is present in a part of the scene, the determination comprising an analysis of the low level features and the high level features; and
- outputting with an output unit output information that there is something present in the scene.

* * * * *